(12) United States Patent
Struzik et al.

(10) Patent No.: US 6,776,370 B2
(45) Date of Patent: Aug. 17, 2004

(54) ENERGY-ABSORBING CONNECTING STRUT FOR USE AS A GEARBOX SUSPENSION STRUT FOR ROTARY WING AIRCRAFT

(75) Inventors: Alain Struzik, rue du Val Saint-André (FR); Vincent Scala, Quartier les Tappes (FR); Michel Salvy, deceased, late of Avenue Marius Ruinat (FR), by Jacqueline Salvy, legal representative

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 10/229,460

(22) Filed: Aug. 28, 2002

(65) Prior Publication Data

US 2003/0057318 A1 Mar. 27, 2003

(30) Foreign Application Priority Data

Sep. 11, 2001 (FR) ............................................ 01 11716

(51) Int. Cl.[7] .............................. B64C 27/00; F16F 7/12
(52) U.S. Cl. ................................ 244/17.27; 244/158 R; 188/377
(58) Field of Search ................................ 244/17.27, 54, 244/158 R; 188/377, 322.22, 322.15, 281, 381; 416/500, 134 A; 184/381, 322.17, 300, 317, 283

(56) References Cited

U.S. PATENT DOCUMENTS

| | | | | |
|---|---|---|---|---|
| 2,042,443 | A | * | 5/1936 | Buckstone |
| 2,346,275 | A | * | 4/1944 | Read et al. .................. 188/317 |
| 3,428,150 | A | * | 2/1969 | Muspratt ..................... 188/377 |
| 3,664,463 | A | * | 5/1972 | Kuethe ........................ 188/377 |
| 3,698,663 | A | * | 10/1972 | Balke et al. .............. 244/17.27 |
| 3,752,462 | A | | 8/1973 | Wight |
| 3,921,940 | A | | 11/1975 | Mouille |
| 4,361,212 | A | * | 11/1982 | Bolang et al. ............... 188/377 |
| 4,431,148 | A | | 2/1984 | Mouille |
| 4,458,862 | A | | 7/1984 | Mouille et al. |
| 4,503,951 | A | * | 3/1985 | Imaizumi ............... 188/322.15 |
| 4,720,060 | A | | 1/1988 | Yana |
| 4,946,721 | A | | 8/1990 | Kindervater et al. |
| 5,035,307 | A | * | 7/1991 | Sadeghi et al. |
| 5,190,244 | A | | 3/1993 | Yana |
| 5,257,680 | A | * | 11/1993 | Corcoran et al. ............ 188/281 |
| 5,535,861 | A | * | 7/1996 | Young ......................... 188/281 |
| 5,613,580 | A | * | 3/1997 | Young ......................... 188/300 |
| 5,730,492 | A | | 3/1998 | Warrick et al. |
| 5,782,430 | A | | 7/1998 | Mouille |
| 5,788,182 | A | | 8/1998 | Guimbal |
| 5,927,646 | A | * | 7/1999 | Sandy et al. ................. 188/377 |
| 6,145,785 | A | | 11/2000 | Certain |
| 6,164,915 | A | | 12/2000 | Certain |
| 6,176,475 | B1 | * | 1/2001 | Bella et al. ............. 188/322.22 |
| 6,283,408 | B1 | | 9/2001 | Ferullo et al. |
| 6,325,327 | B1 | | 12/2001 | Zoppitelli et al. |

FOREIGN PATENT DOCUMENTS

| | | |
|---|---|---|
| EP | 0 110 233 | 11/1983 |
| FR | 2 269 162 | 3/1988 |
| FR | 2 795 793 | 7/1999 |
| JP | 59 089847 | 11/1982 |

\* cited by examiner

*Primary Examiner*—Michael J. Carone
*Assistant Examiner*—Lulit Semunegus
(74) *Attorney, Agent, or Firm*—Sturm & Fix LLP

(57) ABSTRACT

An energy-absorbing connecting strut comprises a substantially straight rigid body with means of connection to two components which it links, and undergoing tensile/compressive stresses. The body comprising a buckling portion with a calibrated buckling load corresponding to a compressive load threshold, a hollowed portion housing a component absorbing energy by plastic deformation in compression, and a piston moving integrally with a rigid axial end part of the body. The body is configured so that under a compressive load greater than the compressive load threshold, the buckling portion deforms causing axial shortening of the connecting strut and movement of the piston with the rigid part, so that the piston crushes and plastically deforms the energy-absorbing component, limiting the load amplitude. The energy-absorbing strut may be used as a suspension strut of a main gearbox on the structure of a rotary wing aircraft.

16 Claims, 3 Drawing Sheets

US 6,776,370 B2

ENERGY-ABSORBING CONNECTING STRUT FOR USE AS A GEARBOX SUSPENSION STRUT FOR ROTARY WING AIRCRAFT

FIELD OF THE INVENTION

The invention relates to an energy-absorbing connecting strut designed to link two components and capable of undergoing axial stresses in tension/compression between these components, so as to absorb energy in case of shock or impact on at least one of the components linked by the strut and which would be such as to develop in the latter a compressive load greater than a specified threshold, so that the shock or impact energy is not wholly transmitted by the connecting strut from one to the other of the two components which it links, and preferably so as to limit the amplitude of the force transmitted.

As an application for which the connecting strut according to the invention is of great relevance for the applicant, the invention also relates to the use of this connecting strut as a suspension strut for a main gearbox on the structure of a rotary wing aircraft, and preferably a helicopter, so that hereafter the invention is described and explained more particularly in this application.

More precisely, the energy-absorbing connecting strut according to the invention is described in its application as a so-called crash-resistant suspension strut, as it is designed to fulfil its functions of absorbing energy and limiting transmitted loads in case of a rotary wing aircraft crash, it being understood that the field of application of such an energy-absorbing connecting strut is not limited to the protection of rotary wing aircraft or at least a part of the latter, in the case of a crash.

BACKGROUND OF THE INVENTION

In general and schematic terms, when a body strikes the ground, it is subjected to inertia forces which are a function of the kinetic energy accumulated by this body prior to the impact and of its deformation caused by the impact, according to the following formula:

$$1/2 \, m \, (V^2 - Vo^2) = \int_o^D F(x) \, dx$$

where ½ mVo² is the kinetic energy of the body prior to the impact, ½ mV² is the kinetic energy of the body after the impact, this energy being zero after an aircraft has crashed, F(x) represents the inertia forces applied to the body, and D is the deformation of the body caused by the impact.

From this general formula, it can be deduced that the inertia forces F(x) are greater the smaller the deformation D of the body.

If we consider the crash of a rotary wing aircraft, particularly a helicopter, in order to ensure the survival of the crew and passengers in the rotary wing aircraft, it is necessary to preserve the volume of the cabin of the rotary wing aircraft to prevent the persons occupying it from being crushed, to limit the deceleration undergone by the crew and passengers to a tolerable level and to preserve the integrity of the fuel tanks in order to prevent a fire or explosion.

In case of impact of a rotary wing aircraft with the ground, the cabin of the rotary wing aircraft is subjected to forces introduced in particular by the landing gear, the contact of the structure of the rotary wing aircraft with the ground, and all the mechanical items attached to the top of the rotary wing aircraft structure such as, in the case of a helicopter for example, the elements of the power unit, the main rotor or rotors and the main gearbox or gearboxes.

In fact, it is known that on state-of-the-art rotary wing aircrafts, and in particular helicopters, the so-called upper mechanical assemblies, namely the engines, rotors and main gearboxes are linked to the structure of the rotary wing aircraft by being bolted directly onto this structure or by a connecting device comprising a set of at least three rigid, non-deforming, straight and inclined suspension struts distributed around the gearbox and tilted so as to converge towards each other at their upper ends by which each strut is connected in a hinged manner to the gearbox, while at its lower end each strut is connected in a hinged manner to the structure of the rotary wing aircraft.

Generally, each suspension strut is hinged at its upper end directly to the main gearbox or, as a variant, to a lever supporting a flapping mass resonator and itself mounted pivotably on the main gearbox, as described for example in U.S. Pat. No. 5,190,244 and U.S. Pat. No. 6,145,785 and, at its lower end, either directly to the structure of the rotary wing aircraft, as described in FR 2 232 481, EP 718 187 and U.S. Pat. No. 5,782,430, or to a lever supporting a flapping mass resonator and itself mounted pivotably on the structure of the rotary wing aircraft, as described in U.S. Pat. No. 4,431,148, U.S. Pat. No. 4,458,862, U.S. Pat. No. 4,720,060, FR 2 777 861, FR 2 787 762 and FR 2 795 386, to which reference should be made for further details.

Currently, protective crash-resistant measures adopted on helicopters are intended to allow the absorption of energy by the landing gear, to limit the forces introduced into the helicopter structure, absorption of energy by the part of the structure under the cabin, known as the subfloor structure, to limit the forces introduced into the cabin structure, and dimensioning of the cabin structure to withstand being crushed by the upper mechanical assemblies mentioned above, linked to this structure by non-deforming means, particularly the suspension struts mentioned above.

In fact, when a crash occurs, the inertia forces originating from said upper mechanical items are very great, because of the weight of these items and the rigidity of their connection to the cabin structure.

If it is wished to preserve the volume of the cabin to prevent its occupants being crushed, the initial dimensioning of the structure, to withstand normal flying loads, is not sufficient. It is necessary to over-dimension the structure in order for it to withstand the loads during the crash, which in practice means that this structure is made very appreciably heavier.

A purpose of the invention is to propose an energy-absorbing connecting strut, the use of which as a suspension strut for a main gearbox on a rotary wing aircraft structure, as part of a crash-resistant connecting device, allows the volume of the rotary wing aircraft cabin to be preserved in the event of a crash, due to the fact that the upper mechanical assemblies can be linked to the cabin of the rotary wing aircraft by means of such connecting struts absorbing the kinetic energy of these upper mechanical assemblies, and preferably also limiting the amplitude of the forces transmitted to the cabin.

Moreover, another purpose of the invention is to propose an energy-absorbing connecting strut which, when it is used to constitute a crash-resistant device, protecting the cabin of a rotary wing aircraft from crushing by the upper mechanical items mentioned above, simultaneously provides a remedy for a number of disadvantages of known crash-resistant devices, such as presented below.

The function of all these known crash-resistant devices is to absorb energy, represented by the product of the load by the deformation.

To limit the load transmitted to a structure and which constitutes a danger of damage to the structure, it is necessary to allow a certain deformation, and known crash-resistant devices introducing deformation are of two types:

one type with elastic deformation of at least one connecting component, and one type with plastic deformation of at least one connecting component.

The main disadvantages of known elastic deformation devices, comprising any spring system, are that they do not dissipate a substantial proportion of the energy which they receive, since they store this energy and then return the greater part of it, which results in practice in a rebound after the initial impact, which is thus followed by a succession of secondary impacts on components already weakened by the initial impact. Moreover, compared with a device absorbing energy by plastic deformation, the amount of travel required to absorb the same quantity of energy in an elastic deformation device is about twice as great because of the difference in the areas below the curves which in both cases express load as a function of deformation, these areas being representative of the absorbed energies. Such a large amount of travel is not always compatible with the size constraints for the energy absorption device.

Concerning known devices absorbing energy by plastic deformation, those proposed in WO 97/28983 for fitting to vehicle seats are triangular-braced devices comprising a telescopic load limiting rod and a tension rod deforming by necking. Though such devices are suitable for supporting seats, the weight of which is limited, they are not suitable for absorbing the high energy levels transmitted by the upper mechanical items to the structure of a rotary wing aircraft cabin in case of a crash, since then the weight of such devices and their size would be considerable.

First generation crash-resistant seats for helicopters were equipped with devices absorbing energy by plastic deformation comprising elastomer block systems cooperating with a punch, or crushable ball systems, the performance of which is inadequate because of the small amount of energy absorbable per unit volume of the plastically deformed material to be usable for protecting a rotary wing aircraft cabin against being crushed by the upper mechanical components.

SUMMARY OF THE INVENTION

These aims are achieved by means of an energy-absorbing connecting strut according to the invention, which comprises a substantially straight rigid body having at each of its two axial ends a connector for connecting respectively to one of the two components that the strut is designed to link, wherein said body comprises at least one buckling portion with calibrated buckling corresponding to a compressive load threshold, at least one hollowed portion housing at least one component absorbing energy by plastic deformation in compression, and at least one piston, facing said energy-absorbing component in said hollowed portion, and moving integrally with a rigid axial end part of said body, so that under a compressive load greater than said compression threshold of said at least one buckling portion, said buckling portion deforms causing axial shortening of said connecting strut, and movement of said piston with said rigid axial end part of the body, so that the piston crushes and plastically deforms said energy-absorbing component.

It is thus possible, with the energy-absorbing connecting strut, to reduce and control the level of force introduced by one of the two components which it links to the other.

In order to prevent any risk of tilting of the connecting strut as it buckles, it is advantageous that said piston should be guided substantially axially in the course of said buckling by a guide mechanism in the body of the strut.

In an advantageously simple and economical mode of embodiment, said guide mechanism for the piston comprises a rigid rod linking the piston to said rigid axial end part of the body, and extending substantially axially into a tubular part of the body, so as to guide substantially axially the movements of said piston with respect to said energy-absorbing component.

In order to limit the axial size of the strut, said tubular part of the body guiding said rigid rod linked to the piston advantageously constitutes at least partially said buckling portion.

This buckling portion may be embodied in any manner known to a person skilled in the art, and may advantageously be bounded by at least one localised reduction in the thickness of the wall of the body.

In an advantageously simple and economic manner, while permitting satisfactory dimensioning of the connecting strut in order to comply with the desired buckling load within an imposed size, said localised reduction in thickness is advantageously constituted by at least one of the following means: notch, groove, slot, score, substantially axial, corrugated axial section and hole in the wall of the body.

In addition, or alternatively, said buckling portion may be constituted at least partially by a material differing from that constituting the rest of the body of the strut, and/or which has at least locally undergone treatment (in particular metallurgical), and/or may present a geometry appropriate to initiating and localising the buckling.

In general terms, the buckling portion may be at least partially constituted of a material which has undergone particular treatment, making its characteristics different from those of the rest of the body of the strut.

Also advantageously, said at least one energy-absorbing component has substantially constant-load crushing characteristics over the greater part of the travel as buckling proceeds, so that the connecting strut limits the load amplitude.

In general, said energy-absorbing component may comprise at least one elastomer material as proposed for example in EP 110 233, and/or a volume of a fluid, preferably viscous, and/or a composite material, such as proposed for example in EP 322 979, or again comprising at least one organic material and/or at least one ceramic and/or at least one metal material and/or mineral or organic reinforcing fibres, with high strength characteristics.

Nevertheless, in order that the overall amount of energy absorbed should be substantial for an energy-absorbing component of small size, the latter advantageously comprises at least one honeycomb structure element, the contiguous cells of which are aligned substantially axially in said body, and preferably metal or composite, the additional advantage of such an energy-absorbing material being that it also allows the load to be limited in amplitude and to be maintained at a substantially constant level during crushing.

Preferably, said hollowed portion of the body is another hollow or tubular part of this body, which encloses said at least one energy-absorbing component, and this other hollow or tubular part of the body may be an enlarged part which is bounded, at the end opposite the piston, by a base, integral with the other rigid end part of the body, and against which said energy-absorbing component bears.

An energy-absorbing connecting strut of this kind lends itself advantageously to application as a crash-resistant main gearbox suspension strut on the structure of a rotary wing aircraft such as a helicopter, and being designed to be linked in a hinged manner, at one end to said gearbox and at its other end to the structure of the rotary wing aircraft, so that by introducing energy absorption into the connection between the structure and the main gearbox, the connecting strut according to the invention enables the level of load introduced by the upper mechanical assemblies into the structure of the rotary wing aircraft in case of a crash to be reduced and controlled. By means of suspension struts constituted by energy-absorbing connecting struts according to the invention, it is possible to dimension a connecting device between the main gearbox and structure of the rotary wing aircraft which is able to absorb the required amount of energy while complying with the desired buckling load within an imposed size.

BRIEF DESCRIPTION OF THE DRAWINGS

Other advantages and characteristics of the invention will emerge from the description given below by way of a non-limiting example of an energy-absorbing connecting strut used as a suspension strut for the main gearbox of a helicopter, and described with reference to the appended drawings in which.

DETAILED DESCRIPTION OF SPECIFIC EMBODIMENTS

Figure 1:
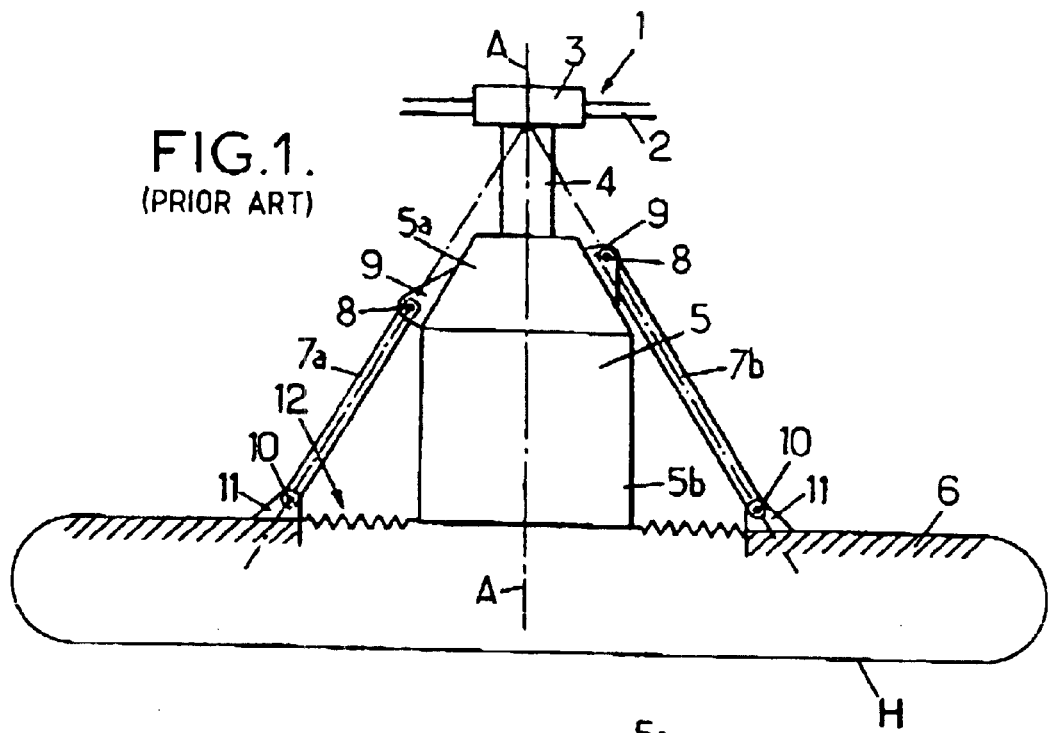
FIGS. 1 and 2 are schematic and partial views respectively in side elevation and in perspective, of a prior art suspension device with straight and inclined struts for a helicopter rotor and main gearbox.

FIG. 1 represents a helicopter main rotor 1 of which the blades 2 are connected to a hub 3 rotating integrally with the upper end of a rotor shaft 4, which is supported at its base in a main gearbox 5 connected, in a manner not shown, by a transmission shaft to the power unit of helicopter H (shown schematically) one type of rotary wing aircraft. The gearbox 5 is coaxial with the shaft 4 about its axis A—A, and drives it in rotation about this axis, which is the axis of rotation of the rotor. As also shown in FIG. 2, this gearbox 5 is suspended on the transmission support platform 6, at the upper part of the helicopter cabin structure, by a known suspension device which comprises a set of four suspension struts, straight and rigid, distributed around the box 5 and arranged obliquely with respect to the axis of rotation A—A so as to converge towards the top of the box 5 and the axis of rotation A—A.

Figure 2:
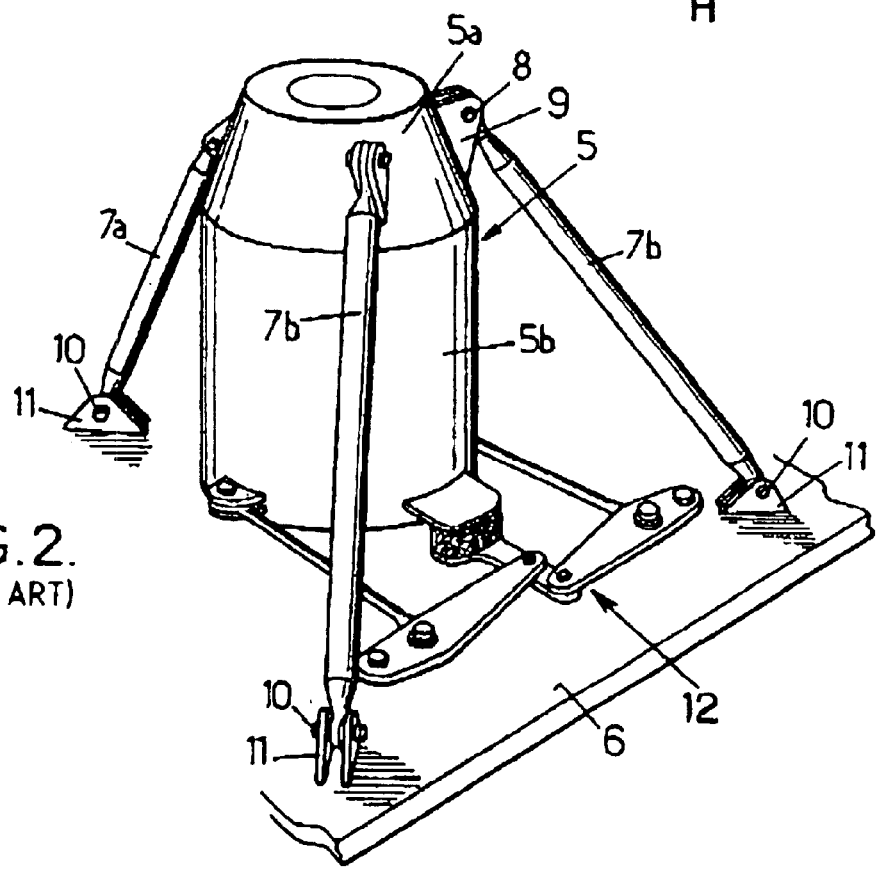
Figure 5:
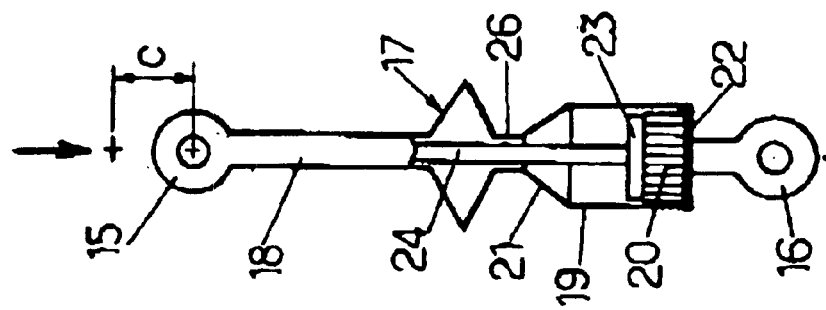
FIG. 5 is a view similar to FIG. 4 but showing the strut after deformation by buckling and energy absorption by crushing of a component absorbing energy by plastic deformation in compression.

In this example, which is described in EP 0 718 187, of which FIGS. 1 and 5 correspond respectively to FIGS. 1 and 2 in this application, these struts comprise two forward struts 7a, arranged towards the front (on the left of FIG. 1) of the helicopter with respect to the box 5, and two aft struts 7b, longer than the forward struts 7a. Each strut 7a or 7b is connected to the truncated cone shaped upper part 5a of the casing of the box 5 at its upper end, connected by a ball joint 8 to an anchoring lug 9 projecting sideways from the upper part 5a of the box 5, and each strut 7a or 7b is connected by its lower end to the transmission support platform 6 of the fuselage by a ball joint 10 connecting it to a structural support 11 of the fuselage, for example a structural attachment fitting riveted or bolted to the transmission support platform 6 above the cabin of the helicopter.

Thus the assembly constituted by the rotor 1, the shaft 4 and the gearbox 5 is suspended on the structure 6 by the set of inclined struts 7a and 7b, the axes of which converge substantially into a point about which the suspended assembly can swing.

The known suspension device also comprises a connecting device 12 linking the base 5b, with the general shape of a cylinder, of the box 5 to the fuselage 6, this device 12 comprising at least one elastic joint allowing movements of the base 5b of the box 5 with elastic return towards the front and towards the rear of the helicopter and/or sideways, and also means of transferring the torque constituted in this example by rods, pivoting levers and an elastomer block, as described more precisely in EP 0 718 187 to which reference may be made for further details relating to this.

In case of a helicopter crash, to prevent the cabin being crushed under the transmission support platform 6 by the assembly constituted by the rotor 1, shaft 4 and gearbox 5, each of the suspension struts 7a and 7b is embodied in the form of an energy-absorbing connecting strut according to the example in FIGS. 3 to 5 or the one in FIGS. 6 and 7 described below.

Figure 4:
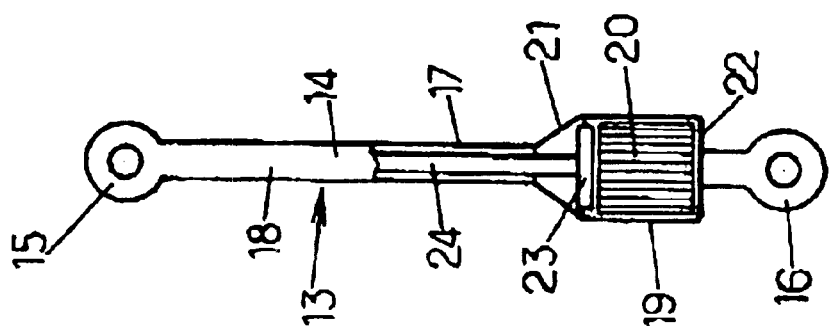
FIG. 4 is a schematic view in axial section of the strut in FIG. 3.
Figure 3:
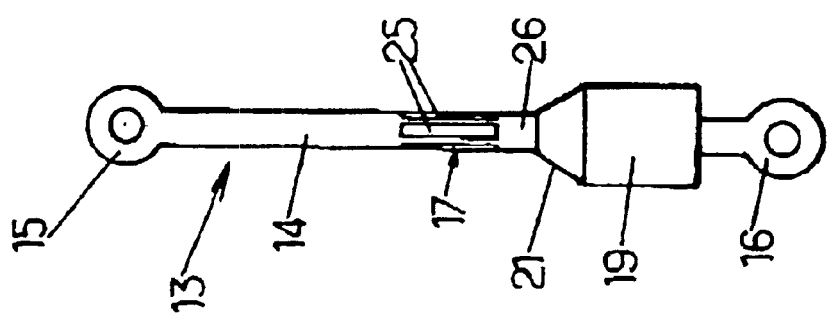
FIG. 3 is a schematic view in side elevation of a first example of an energy-absorbing connecting strut usable as a suspension strut in a device according to FIGS. 1 and 2.

In the example in FIGS. 3 to 5, the energy-absorbing connecting strut 13 comprises a substantially straight and partly hollow body 14 which is fitted, at each of its two axial ends, with connecting means in the form of an eye fitting 15 at its upper end in FIGS. 3 to 5 or 16 at its lower end, and designed to receive a ball joint and/or a pivot pin to provide the hinged connection of the upper end fitting 15 for example to a lug 9 on the main gearbox 5 in FIGS. 1 and 2, and of the lower end fitting 16 to a structural support 11 of the structure 6 in the same FIGS. 1 and 2, although the direction of fitting of the strut 13 may be reversed, since the direction of mounting has no effect on its operation, as will be understood below.

The body 14 is rigid, except at a tubular portion 17, termed the buckling portion, since its geometry and/or its structure are arranged so that this axial tubular portion 17 presents a calibrated buckling load, which corresponds to a compression load threshold such that, when the body 14 of the strut 13 is subjected to a compressive stress by a substantially axial load greater than the threshold mentioned above, this buckling portion 17 deforms by buckling, as shown schematically in FIG. 5, and so causes axial shortening of the strut 13, the body 14 of which, apart from the buckling portion 17, is substantially non-deforming when subjected to the maximum loads which this strut 13 is designed to receive.

The buckling portion 17 extends axially between a rigid upper end part 18 of the body 14 and a tubular part 19 enlarged in this example of embodiment, bounding an internal axial chamber of cylindrical shape enclosing a component 20 absorbing energy by plastic deformation in compression.

The tubular buckling portion 17 extends in axial prolongation of the rigid upper end part 18, and is connected, by a truncated cone shaped tubular part 21 flaring towards the lower fitting 16, to the enlarged tubular part 19, the internal chamber of which is closed, towards the lower fitting 16, by a rigid base 22 integral with the rigid lower end part fitted with the lower fitting 16.

A piston 23 is arranged in the chamber of the enlarged part 19, above the energy-absorbing component 20, and this rigid piston 23 is rigidly linked to the rigid upper end part 18 by an axial rigid rod 24.

In normal operation on a helicopter, the partly tubular body 14 of the strut 13 is dimensioned to withstand without appreciable deformation, due to its great rigidity, the tensile and compressive loads corresponding to the flight loads, in the case of application of FIGS. 1 and 2, in which four struts such as 13 support the main gearbox 5 and the rotor 1 of the helicopter.

In the event that the helicopter crashes, each strut 13, used as a suspension strut such as 7a or 7b, is subjected to an axial load arising from the weight of the dynamic assembly constituted by the blades 2, hub 3 and main gearbox 5. This axial load, which is greater than the maximum flight loads for which the body 14 of the strut 13 was dimensioned, and which determine the compressive load threshold of the buckling portion 17, is therefore greater than this compressive load threshold, so that it causes buckling of this portion 17, which axially has localised reductions in thickness of the tubular wall of the body 14 in that area, in the form of axial notches 25 (see FIG. 3) distributed over the periphery of this buckling portion 17.

As a variant, these notches 25 which give the tubular portion 17 its ability to deform by buckling may be replaced by or combined with other forms of localised reductions in the thickness of the wall, in order to reduce the strength in compression of this tubular portion 17, for example scoring, slots, grooves, which all extend substantially axially, corrugations of the axial section of this tubular portion and/or also holes, several different forms of thinning of the wall, including openings or drillings made in the wall, which may be combined.

In addition, it is also possible to embody this tubular buckling portion 17 in a different material from that constituting the rest of the body 14, and/or to apply treatment (metallurgical in particular) at least locally to this buckling portion 17, and/or also to give this buckling portion 17 a geometry, in particular of the transverse section, which is capable of initiating and localising the calibrated buckling desired in this portion 17.

The buckling of this portion 17 causes axial shortening of the strut 13, marked 'c' in FIG. 5, and therefore movement of the piston 23 with the rigid upper end part 18 of the body 14, because of the rigid rod 24, which guides substantially axially the piston 23 in this movement while being itself guided in the tubular buckling portion 17 in the process of deformation. By this movement, the piston 23 crushes the energy-absorbing component 20 axially against the base 22, so that energy is absorbed by the plastic deformation of the component 20, embodied in one or more materials and with a structure such that crushing of the component takes place at substantially constant load over a certain travel as crushing proceeds. This enables the force transmitted axially between the upper fitting 15 and the lower fitting 16 to be limited to a certain value during a certain travel of the component 20 as compressive deformation proceeds.

In the course of this deformation, the risk of the strut 13 tilting during buckling of the portion 17 is controlled by the guidance of the piston 23 in the enlarged tubular part 19 of the body 14.

The material or materials as well as the structure of the energy-absorbing component 20, and in particular its axial thickness, are determined and calculated to absorb a predetermined amount of energy. It will be understood that in the case of a helicopter crash, all of the struts 13 supporting the main gearbox 5 in FIGS. 1 and 2 will have to absorb the kinetic energy of this box 5 and of the main rotor 1.

To provide satisfactory guidance of the rod 24 and the piston 23 axially in the body 14 during buckling of the portion 17, the notches 25 in this portion 17 do not extend as far as the truncated cone shaped tubular connecting part 21, so that a tubular zone 26 of the body 14 remains non-deforming between the buckling portion 17 and the truncated cone shaped connecting portion 21, and this tubular zone 26 provides satisfactory axial guidance of the rod 24.

The body 14 may be of alloy or stainless steel, or again of aluminium or titanium, though this list of metals is non-limiting, or again of a composite material with metal matrix strengthened with reinforcing fibres with high strength characteristics, or again of composite with a matrix of another type strengthened with mineral or organic fibres with high strength characteristics, for example carbon or glass fibres, possibly woven.

The piston 23 and/or the rod 24 may be embodied in the same materials as the body 14, or in different materials, and if the embodiment of these is of metal, the piston 23 may be welded to the rod 24 which is itself welded to the rigid upper axial end part 18 of the body 14, for example by a process of electron beam welding. As a variant, the piston 23 may be fitted, by screwing for example, to the end of the rod 24 itself made integral by any appropriate means, at its opposite end, with the rigid upper end part 18 of the body 14. In case of embodiment in composite materials, the piston 23 and the rod 24 may be embodied to form a single part with the rigid upper end part 18 of the body 14.

The energy-absorbing component 20, also enabling the amplitude of the axial compressive load to be limited, is embodied for example in the form of a component with a honeycomb structure, the contiguous cells of which are aligned substantially axially in the enlarged tubular part 19 of the body 14. Preferably, this honeycomb component 20 is embodied in a metal material, for example steel, although aluminium or titanium may also be used to embody this honeycomb component 20. A component 20 of steel honeycomb proves highly effective, with a particularly well stabilised crushing load and maximum area (load× deformation), and therefore high energy absorption.

However, as a variant, this energy-absorbing component 20 may be embodied in composite materials, particularly a composite comprising an organic resin, ceramics and/or metal balls, or again a component of composite honeycomb with a synthetic matrix strengthened with mineral or organic fibres, or again an arrangement with at least one elastomer block, possibly with hollow compartments, or again a component including a given volume of a viscous fluid, without being limiting.

Where the body 14, the piston 23 and the rod 24 are metal, all these components can be electron beam welded, and this technique ensures that there is little deformation after welding and that the range of connecting struts 13 embodied in this way is optimised, with no reworking of the assembled components.

The connecting strut 13 constituted in this way has the advantage of two independent modes of operation, which are the normal mode of operation in flight and the mode of operation in the event of a crash, which enables each of the two modes of operation to be optimised.

In normal mode, the connecting strut 13 has great rigidity, and can work both in tension and in compression, which is not permitted by the majority of state-of-the-art crash-resistant devices.

Except at its enlarged tubular part 19, containing the crushable material or materials constituting the energy-absorbing component 20, the size of this strut 13 remains very close to that of a suspension strut such as 7a or 7b in FIGS. 1 and 2 according to the state-of-the-art, and is capable of withstanding the same nominal loads. However, this enlarged part 19 of the connecting strut 13 of the invention may be positioned to suit size constraints. In particular, as the suspension struts 7a and 7b of the main gearbox 5 converge towards each other at their upper ends, it may be appropriate to use struts 13 by arranging the enlarged tubular part 19 at the lower end, connected to the structure of the helicopter, in the relatively unobstructed parts of the transmission support platform.

Moreover, in certain applications, dimensioning constraints do not necessarily require enlargement of the part 19, making the size of this strut 13 still closer to that of a strut according to the state-of-the-art capable of withstanding the same nominal loads.

In the crash configuration, the use of connecting struts such as 13 makes it possible, by introducing energy absorption in the connection between the main gearbox 5 and the structure 6, to reduce and control the level of load introduced by these struts 13 into the structure 6. A suspension device comprising such connecting struts 13 therefore provides control of three parameters, which are the overall amount of energy absorbed, the level of load stabilised during substantially the entire duration of the absorption, and the crushing length c (see FIG. 5). Moreover, the arrangement of the piston 23 at the end of a rod 24 extending substantially axially into a tubular part 17–26 of the body 14 enables the whole of the strut 13 to remain substantially straight during the crash, which guarantees that it operates properly.

The use of connecting struts such as 13 as suspension struts of a main gearbox on the structure of the helicopter allows overall lightening because of the less stringent dimensioning of the structure made possible by the limitation of the forces of inertia of the upper mechanical assemblies which are transmitted to the structure by the struts 13 when a crash occurs.

Finally, it is possible to retrofit such energy-absorbing connecting struts 13 in place of the conventional suspension struts fitted to helicopters already in service, to increase the dimensioning margins in case of a crash and/or to meet stricter crash-resistance requirements.

Figure 6:
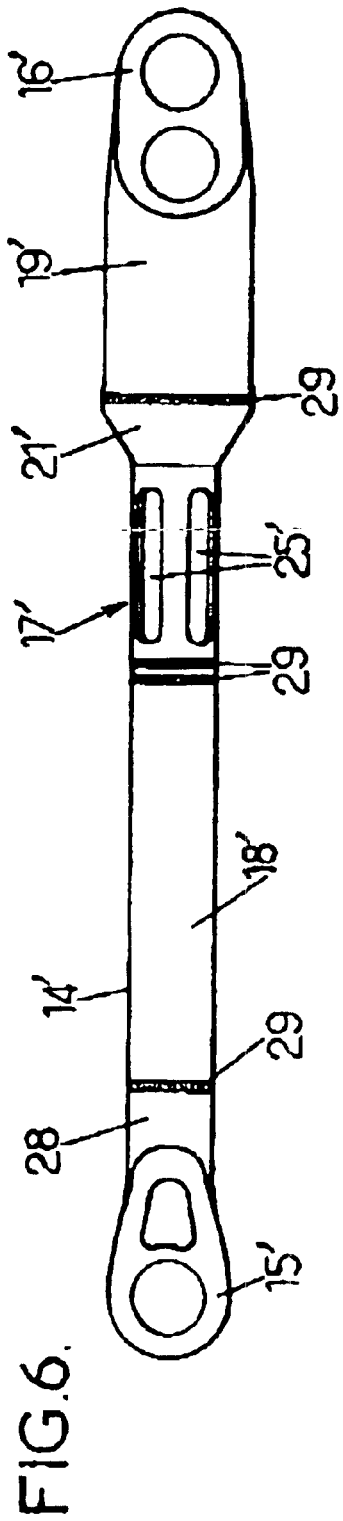
FIG. 6 is a view similar to FIG. 3 of another example of a strut according to the invention.
Figure 7:
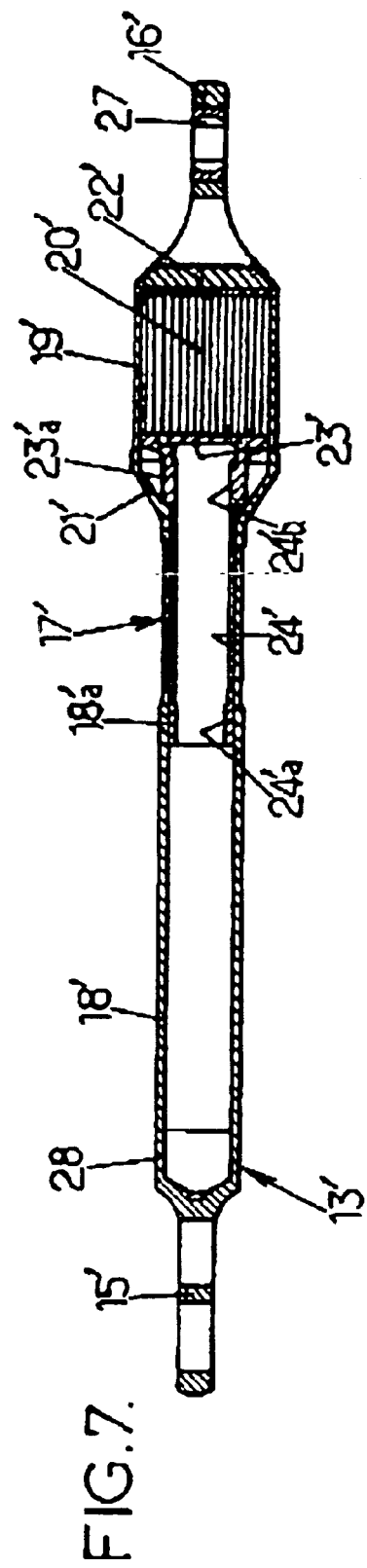
FIG. 7 is a view in axial section and partial view of the strut in FIG. 6.

The energy-absorbing connecting strut according to the embodiment in FIGS. 6 and 7 is a variant of the strut 13 in FIGS. 3 to 5, and is distinguished from it mainly in the tubular embodiment not only of the rigid axial end part 18' of the body 14' with which the piston 23' moves integrally when deformation by buckling of its buckling portion 17' occurs, but also of the rigid rod 24', making the piston 23' integral with this tubular rigid end part 18', to which the rod 24', in the form of a length of tube, is welded at one axial end 24'a to the inside of the end 18'a of the tubular end part 18' which is adjacent to the buckling portion 17', whereas the other end 24'b of the tubular rod 24' is welded to the inside of an axial sleeve 23'a forming a single piece with the piston 23' and extending to the inside of the truncated cone shaped tubular part 21' connecting substantially the buckling portion 17' to the enlarged tubular part 19' which encloses the energy-absorbing component 20', bearing against the base 22' of the other rigid axial end of the body which is constituted by the end fitting 16' with ball joint 27.

As in the previous example, the energy-absorbing component 20' is preferably a component with a honeycomb structure with contiguous cells aligned axially and preferably of stainless steel.

In this variant, the eye end 15' may form a single piece with a blind sleeve 28 welded coaxially into the prolongation of the rigid and tubular axial end part 18' of the body 14', this part 18' being also electron beam welded to the corresponding end not only of the tubular rigid rod 24' but also of the buckling portion 17' bounded in this example too by axial notches 25', while the enlarged tubular part 19' is also made integral at the end with the truncated cone shaped tubular part 21' by an electron beam weld. These different lines of welds are identified schematically as 29 in FIG. 6.

The operation of the connecting strut 13' described with reference to FIGS. 6 and 7 is the same as that described above for the strut 13 in FIGS. 3 to 5, and its use as a suspension strut for a main gearbox on the structure of the helicopter has the same advantages.

Quite clearly, such a strut 13 or 13' can be used not only as a suspension strut such as 7a or 7b in a suspension device according to EP 0 718 187, in which the upper end of each suspension strut is directly hinged to the main gearbox, while its lower end is directly hinged to the structure, but also in suspension devices such as described in the other patent documents quoted above, in which the upper end of the suspension strut may be hinged to a lever which is itself hinged to the main gearbox 5, while the lower end of the strut is hinged directly to the structure 6, or again in which the lower end of the suspension strut is hinged to a flapping mass resonator lever itself hinged to the structure of the helicopter, while the upper end of the suspension strut is hinged directly to the main gearbox.

The invention has now been described in detail for purposes of clarity and understanding. However, it will be appreciated that certain changes and modifications may be practised within the scope of the appended claims.

What is claimed is:

1. An energy-absorbing connecting strut designed to link two components and capable of undergoing axial stresses in tension/compression between said components, said strut comprising a substantially straight rigid body, having at each of its two axial ends a connector for connecting respectively to one of said components, wherein said body comprises at least one buckling portion with a calibrated buckling load corresponding to a compressive load threshold, at least one hollowed portion housing at least one component absorbing energy by plastic deformation in compression, and at least one piston facing said energy-absorbing component in said hollowed portion and moving integrally with a rigid axial end part of said body, whereby under a compressive load greater than said compression threshold of said at least one buckling portion, said buckling portion is deformed causing axial shortening of said connecting strut and movement of said piston with said rigid axial end part of the body, so that the piston crushes and plastically deforms said energy-absorbing component.

2. A connecting strut according to claim 1, wherein said piston is guided substantially axially by a guide in the body when buckling.

3. A connecting strut according to claim 2, wherein said guide for the piston comprises a rigid rod linking the piston to said rigid axial end part of the body and extending substantially axially into a tubular part of the body, so as to guide substantially axially movement of said piston with respect to said energy-absorbing component.

4. A connecting strut according to claim 3, wherein said tubular part of the body guiding said rigid rod linked to the piston constitutes at least partially said buckling portion.

5. A connecting strut according to claim 1, wherein said body has a tubular wall, with said buckling portion being bounded by at least one localised reduction in thickness of the tubular wall.

6. A connecting strut according to claim 5, wherein said at least one localised reduction in thickness is constituted by at least one feature selected from the group consisting of: notch, groove, slot, scoring, substantially axial, corrugated axial section and hole in the wall of the body.

7. A connecting strut according to claim 1, wherein said buckling portion comprises at least partially a material which is different from that constituting another part of the body of the strut.

8. A connecting strut according to claim 1, wherein said buckling portion consists at least partially of a material which has undergone particular treatment, making its characteristics different from those of another part of the body of the strut.

9. A connecting strut according to claim 1, wherein said buckling portion has a geometry appropriate to initiate and localise buckling when said buckling portion is deformed.

10. A connecting strut according to claim 1, wherein said at last one energy-absorbing component has substantially constant-load crushing characteristics so that the connecting strut limits load amplitude.

11. An energy absorbing connecting strut designed to link two components and capable of undergoing axial stresses in tension/compression between said components, said strut comprising a substantially straight rigid body, having at each of its two axial ends a connector for connecting respectively to one of said components, wherein said body comprises at least one buckling portion with a calibrated buckling load corresponding to a compressive load threshold, at least one hollowed portion housing at least one component absorbing energy by plastic deformation in compression, wherein said energy-absorbing component comprises at least one honeycomb structure component having contiguous cells which are aligned substantially axially in said body, and at least one piston facing said energy-absorbing component in said hollowed portion and moving integrally with a rigid axial end part of said body, whereby under a compressive load greater than said compression threshold of said at least one buckling portion, said buckling portion is deformed causing axial shortening of said connecting strut and movement of said piston with said rigid axial end part of the body, so that the piston crushes and plastically deforms said energy-absorbing component.

12. A connecting strut according to claim 1, wherein said energy-absorbing component comprises at least one constituent selected from the group consisting of an elastomer material, a volume of a fluid, a composite material comprising at least one organic material, a composite material comprising at least one ceramic, and a composite material comprising at least one metal material.

13. A connecting strut according to claim 1, wherein said hollowed portion of the body is another hollow or tubular part of said body which encloses said at least one energy-absorbing component.

14. A connecting strut according to claim 13, wherein said part of the body enclosing said energy-absorbing component is an enlarged part of the body which is bounded at one end opposite the piston by a base, integral with the respective rigid end part of the body, and against which said energy-absorbing component bears.

15. A rotary wing aircraft, comprising an aircraft frame, a main gearbox for wing rotation, and a plurality of suspension struts connecting the main gearbox in a hinged manner to the aircraft frame, wherein at least one suspension strut is an energy-absorbing connecting the strut having a substantially straight rigid body, wherein said body comprises at least one buckling portion with a calibrated buckling load corresponding to a compressive load threshold, at least one piston facing said energy-absorbing component in said hollowed portion and moving integrally with a rigid axial end part of said body, whereby under a compressive load greater than said compression threshold of said at least one buckling portion, said buckling portion is deformed causing axial shortening of said connecting strut and movement of said piston with said rigid axial end part of the body, so that the piston crushes and plastically deforms said energy-absorbing component.

16. A rotary wing aircraft according to claim 15, configured as a helicopter.

* * * * *